United States Patent
Morden et al.

(10) Patent No.: US 8,641,130 B2
(45) Date of Patent: Feb. 4, 2014

(54) VEHICLE COWL COVER

(75) Inventors: Thomas R Morden, Clarkston, MI (US); Vinod Desai, Royal Oak, MI (US)

(73) Assignees: Nissan North America, Inc., Franklin, TN (US); Shape Corp., Grand Haven, MI (US)

( * ) Notice: Subject to any disclaimer, the term of this patent is extended or adjusted under 35 U.S.C. 154(b) by 109 days.

(21) Appl. No.: 13/242,212

(22) Filed: Sep. 23, 2011

(65) Prior Publication Data

US 2013/0076071 A1    Mar. 28, 2013

(51) Int. Cl.
  *B62D 25/08*    (2006.01)

(52) U.S. Cl.
  USPC .............. 296/187.04; 296/187.09; 296/192

(58) Field of Classification Search
  USPC .............. 296/192, 96.21, 96.22, 187.09, 208, 296/187.04
  See application file for complete search history.

(56) References Cited

U.S. PATENT DOCUMENTS

| | | | |
|---|---|---|---|
| 4,466,654 A * | 8/1984 | Abe | 296/192 |
| 4,765,672 A | 8/1988 | Weaver | |
| 6,193,304 B1 | 2/2001 | Takahashi et al. | |
| 6,565,148 B1 | 5/2003 | Teramoto et al. | |
| 6,830,288 B2 | 12/2004 | Eynon et al. | |
| 7,004,534 B2 | 2/2006 | Yoshii et al. | |
| 7,316,447 B2 * | 1/2008 | Kelly | 296/192 |
| 7,316,448 B2 | 1/2008 | Koyama et al. | |
| 7,357,446 B2 | 4/2008 | Sakai et al. | |
| 2004/0124669 A1 * | 7/2004 | Eynon et al. | 296/192 |
| 2005/0179285 A1 | 8/2005 | Nakajima et al. | |
| 2011/0049933 A1 | 3/2011 | Serizawa et al. | |
| 2011/0076435 A1 * | 3/2011 | Tachibana et al. | 428/43 |

FOREIGN PATENT DOCUMENTS

| | | |
|---|---|---|
| EP | 1-155-931 A2 | 11/2001 |
| JP | 05-016836 A | 1/1993 |
| JP | 2005-219626 A | 8/2005 |
| JP | 2005-280628 A | 10/2005 |
| JP | 2005-289237 A | 10/2005 |
| JP | 2006-231945 A | 9/2006 |
| JP | 2006-347326 A | 12/2006 |
| JP | 2007-106366 A | 4/2007 |
| JP | 2007090999 A * | 4/2007 |
| JP | 2007-125995 A | 5/2007 |
| JP | 2010006313 A * | 1/2010 |

* cited by examiner

*Primary Examiner* — Jason S Morrow
*Assistant Examiner* — E Turner Hicks
(74) *Attorney, Agent, or Firm* — Global IP Counselors

(57) ABSTRACT

A vehicle cowl cover includes a main body and a first yielding portion. The main body includes a first lateral end portion defining a first end edge and a second lateral end portion defining a second end edge. The first yielding portion is attached along a majority of the first end edge such that the first yielding portion at least partially forms a first end surface of the first lateral end portion. The first yielding portion has a first elasticity greater than a second elasticity of the main body.

20 Claims, 19 Drawing Sheets

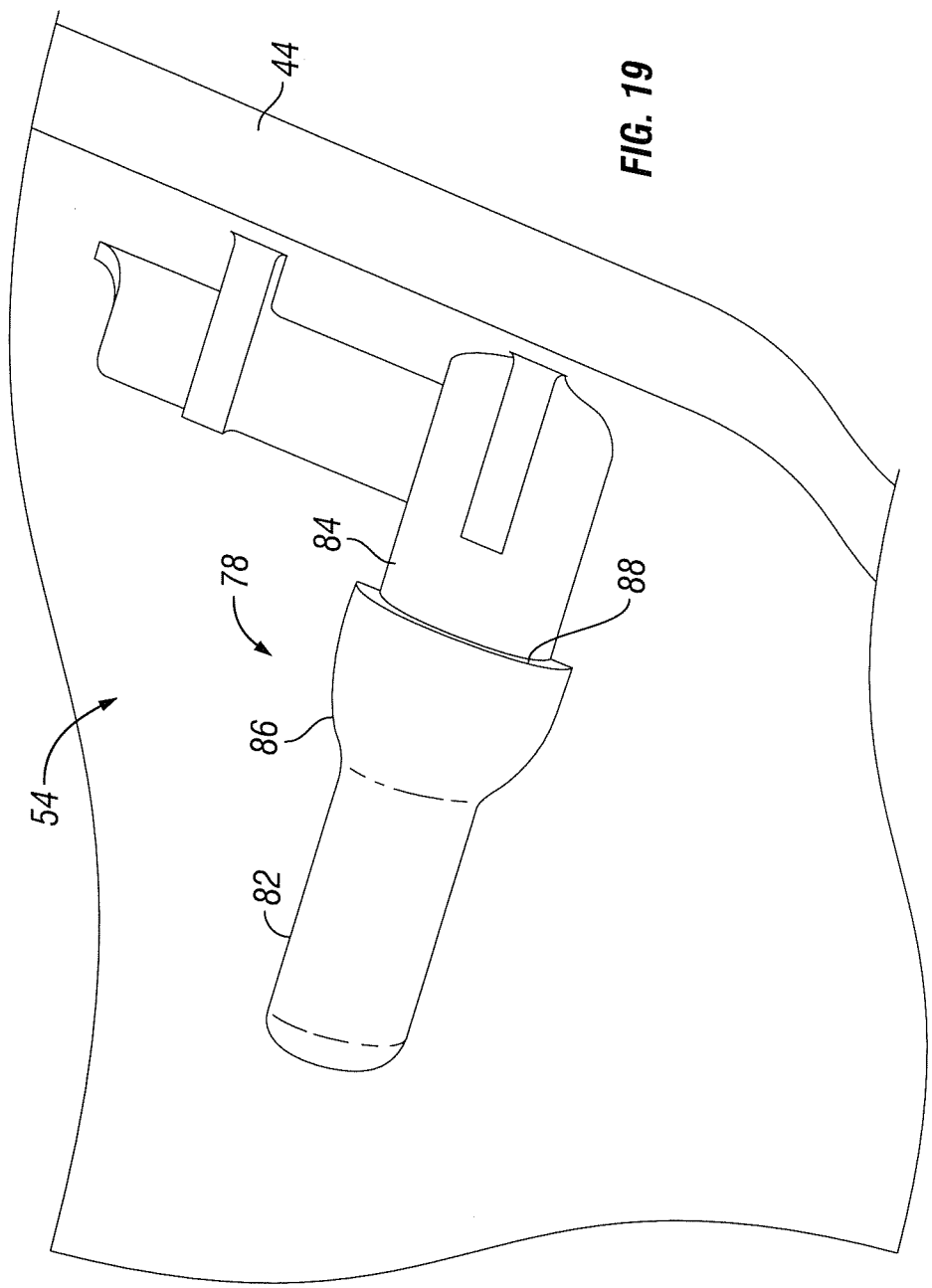

US 8,641,130 B2

VEHICLE COWL COVER

BACKGROUND

1. Field of the Invention

The present invention generally relates to a vehicle cowl cover. More specifically, the present invention relates to a vehicle cowl cover including at least one yielding portion having elasticity greater than that of the main body of the cowl cover to increase yielding characteristics of the vehicle cowl cover area.

2. Background Information

Vehicle designers are routinely seeking new ways to increase the safety of vehicles such as automobiles, trucks, SUVs, vans and so on. For example, vehicle designers consider many different scenarios that involve contact of the vehicle with objects (e.g., structures, other vehicles, pedestrians, foreign objects, etc.) while the vehicle is in motion. Naturally, vehicle designers continuously strive to design vehicles that can mitigate the intensity of forces applied to objects when such contact occurs.

One area of interest is the vehicle hood and cowl area, because a forward motion impact with an object typically results in contact between the object and this area of the vehicle. As understood in the automotive art, vehicle hoods are typically formed from stamped metal and tend to be fairly rigid components. Therefore, there may be practical limitations to the manner in which hood configurations can be changed to reduce the force that the hood may exert on an object during a collision.

In addition, vehicles are designed to withstand a wide variety of weather and environmental conditions. Naturally, such vehicles are constructed to prevent or at least minimize the amount of water and debris that can accumulate on or within a vehicle. For example, rain water can collect and add weight to a vehicle, seep into various areas of the vehicle, or deposit unsightly residue when such water evaporates. Accordingly, rain water may need to be diverted so that the water does not collect within the body structure of the vehicle.

In view of the above, it will be apparent to those skilled in the art from this disclosure that there exists a need for an improved vehicle cowl cover. This invention addresses this need in the art as well as other needs, which will become apparent to those skilled in the art from this disclosure.

SUMMARY

In view of the state of the known technology, one aspect of the invention provides a vehicle cowl cover including a main body and a first yielding portion. The main body includes a first lateral end portion defining a first end edge and a second lateral end portion defining a second end edge. The first yielding portion is attached along a majority of the first end edge such that the first yielding portion at least partially forms a first end surface of the first lateral end portion. Also, the first yielding portion has a first elasticity greater than a second elasticity of the main body.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 19 is a detailed perspective view of one of the retaining projections of the yielding portion shown in FIGS. 16 through 18.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
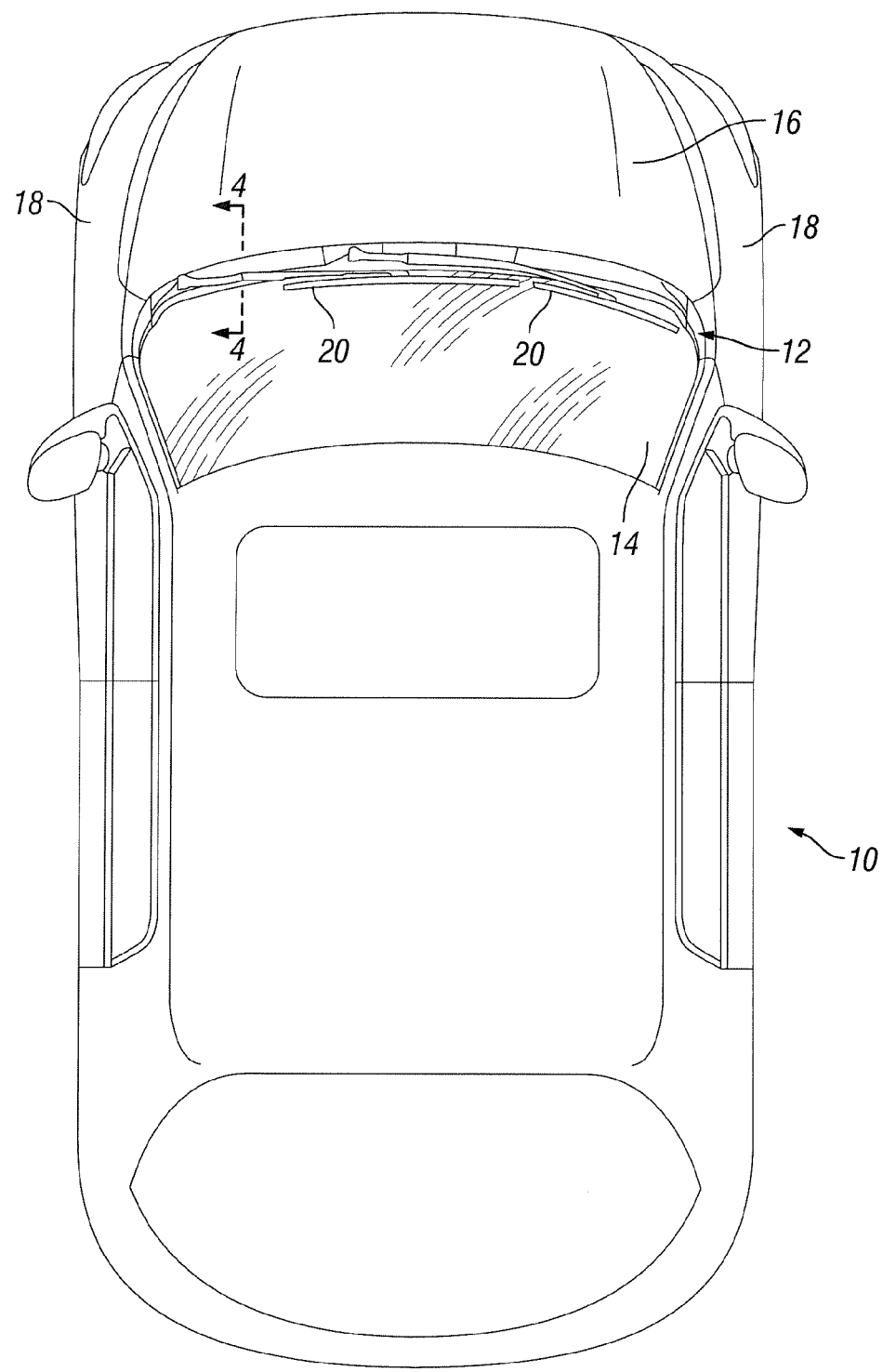
FIG. 1 is a top view of a vehicle including a vehicle cowl cover according to a disclosed embodiment.

Referring initially to FIG. 1, an automotive vehicle 10 with a vehicle cowl cover 12 is illustrated according to an embodiment. The vehicle 10 is conventional, except for the vehicle cowl cover 12 as described herein. Accordingly, the vehicle 10 and its various parts will not be discussed and/or illustrated in detail herein, except as related to the vehicle cowl cover 12. The vehicle 10 can be any type of vehicle such as an automobile, a truck, an SUV, a van and so on. As further shown, the vehicle 10 includes a windshield 14, a hood 16, fender panels 18 and windshield wipers 20, which can all be conventional as understood in the automotive art.

Figure 2:
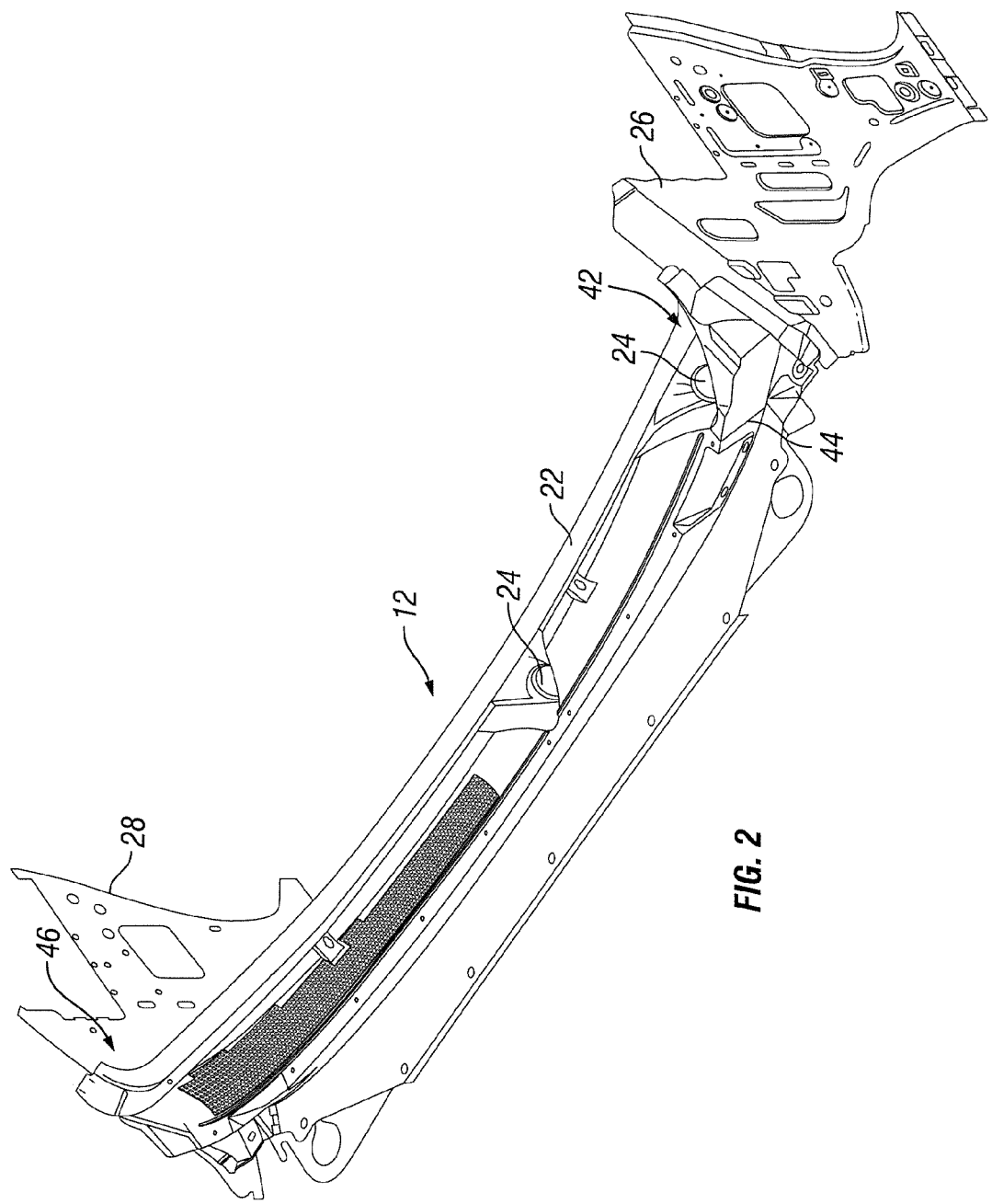
FIG. 2 is a perspective view of the vehicle cowl cover and associated components of the vehicle as shown in FIG. 1.
Figure 3:
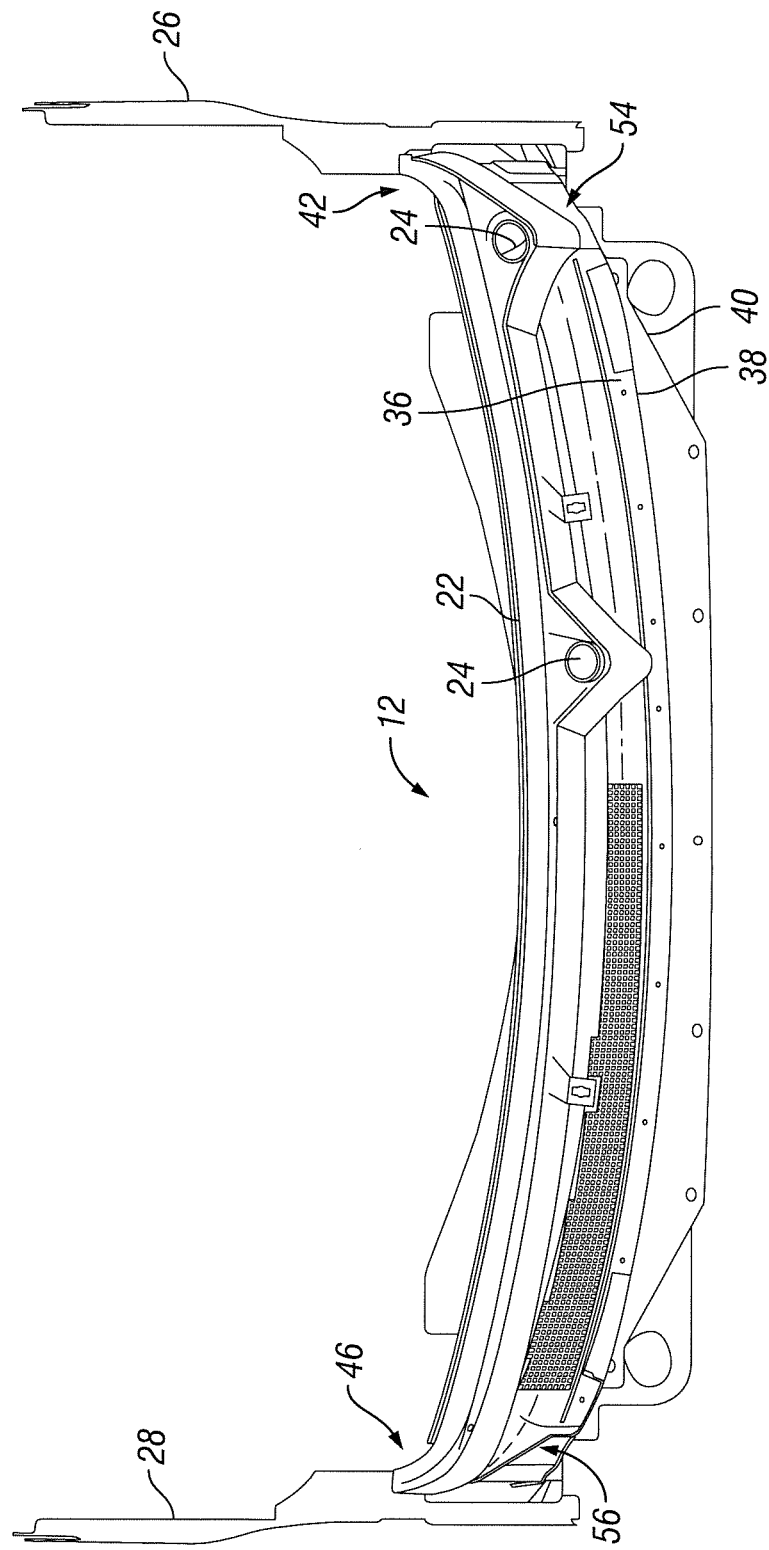
FIG. 3 is a top plan view of the vehicle cowl cover.
Figure 4:
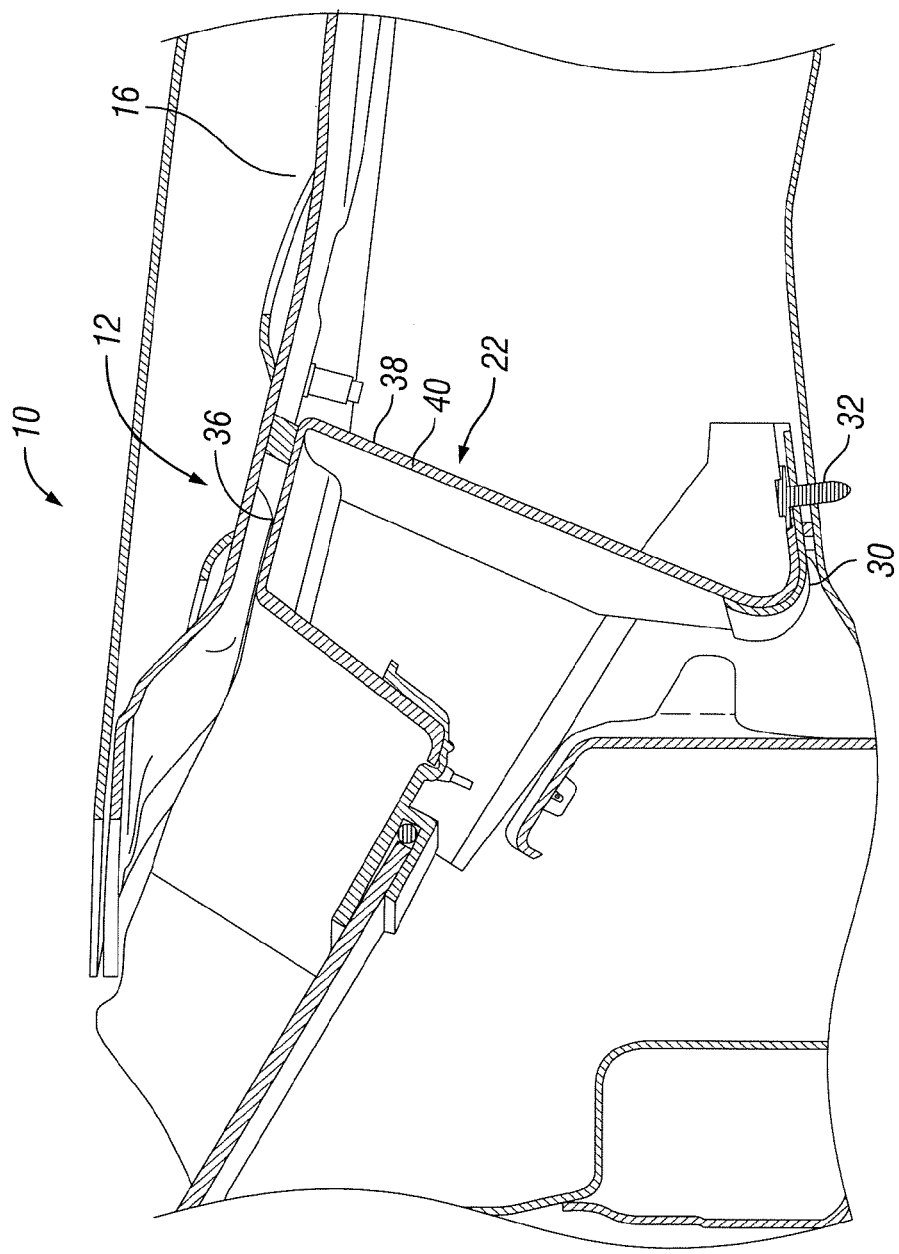
FIG. 4 is a cross-sectional view of the vehicle cowl cover and surrounding area taken along lines 4-4 in FIG. 1.
Figure 5:
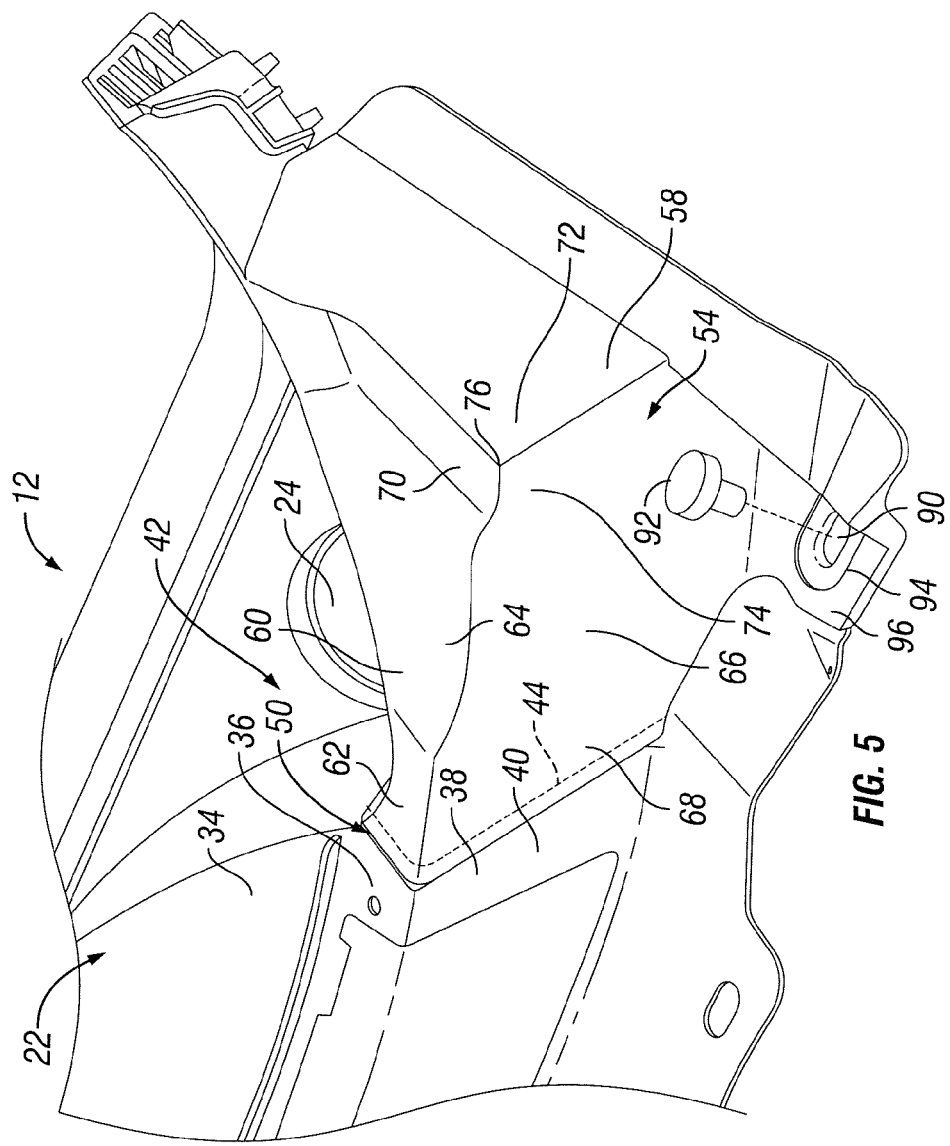
FIG. 5 is a front perspective view of a first side (e.g., a driver's side) of the vehicle cowl cover.
Figure 6:
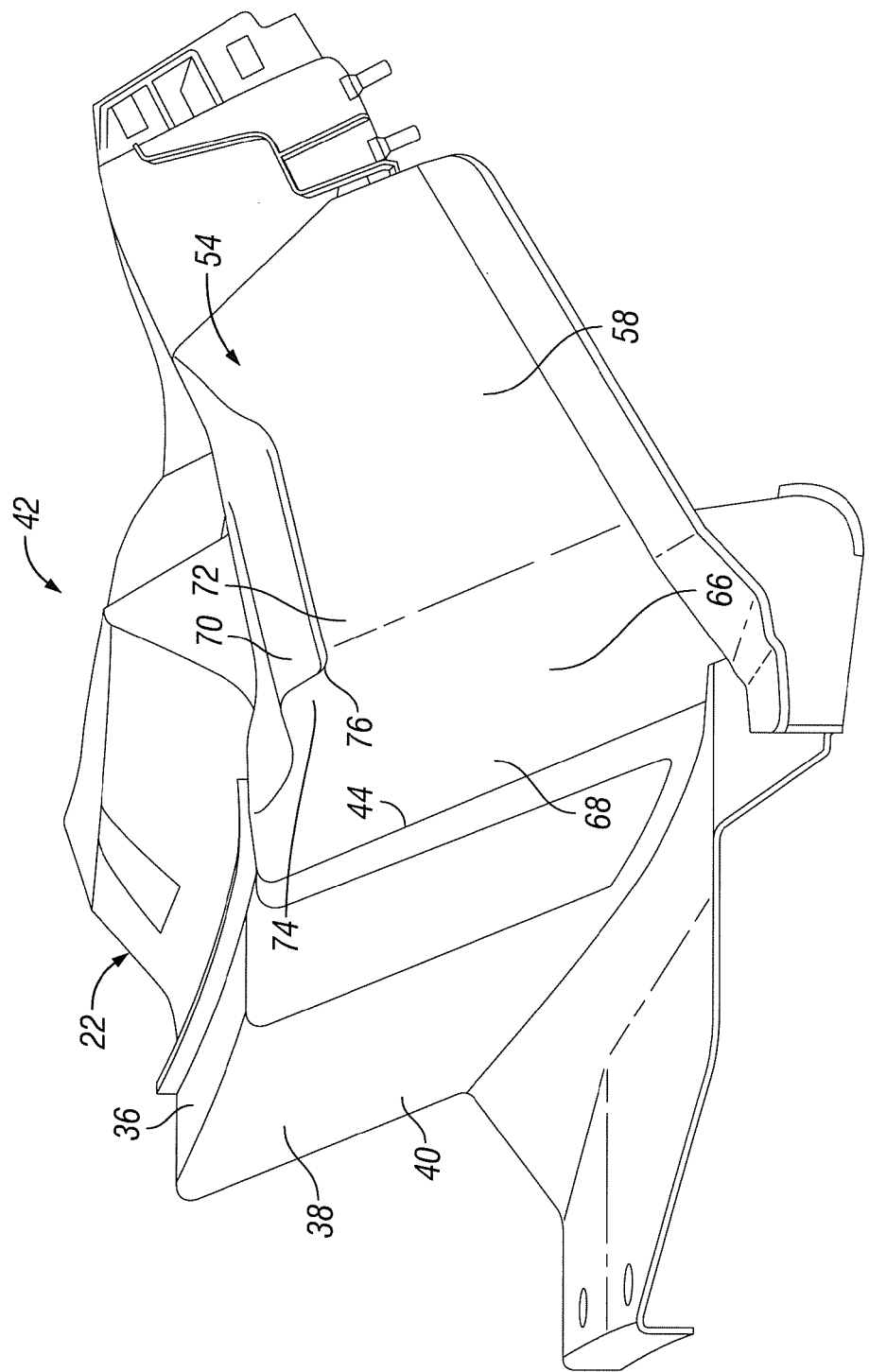
FIG. 6 is a detailed side view of the driver side of the vehicle cowl cover.
Figure 7:
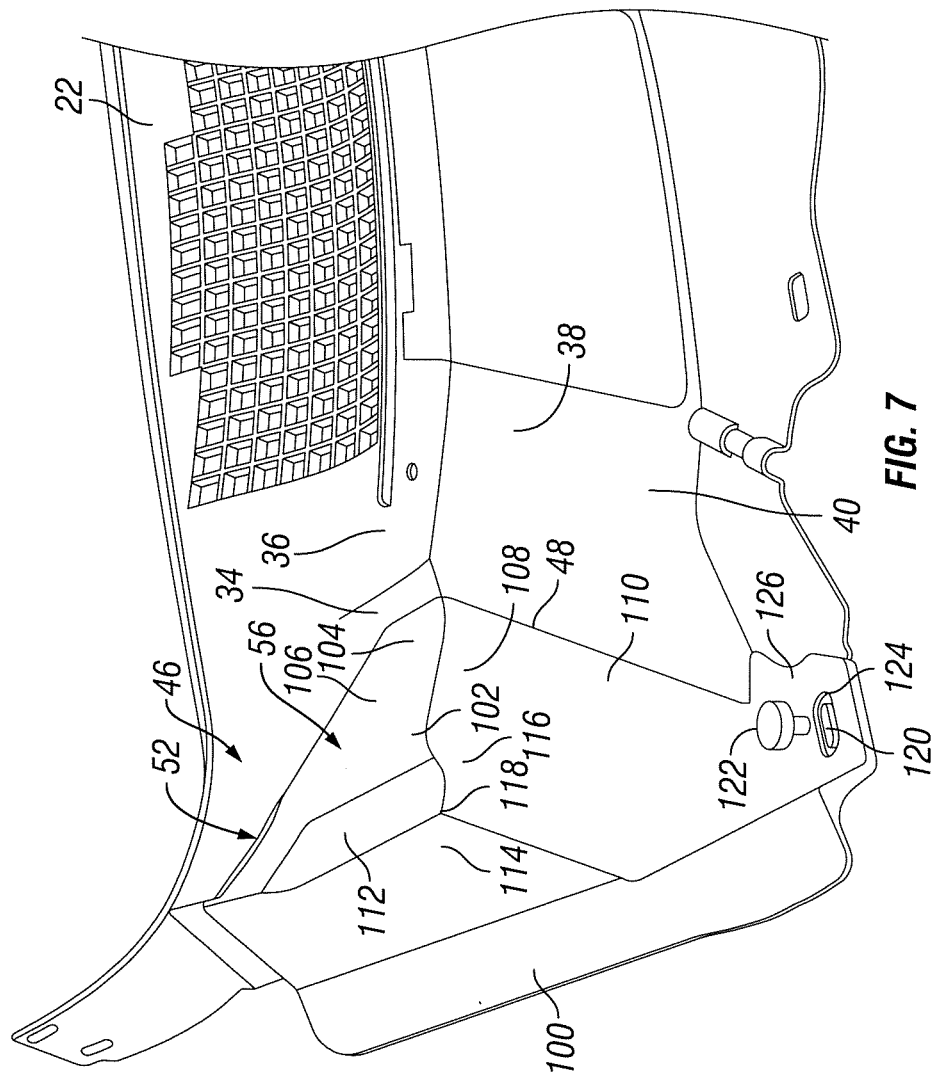
FIG. 7 is a front perspective view of a second side (e.g., a front passenger's side) of the vehicle cowl cover.
Figure 8:
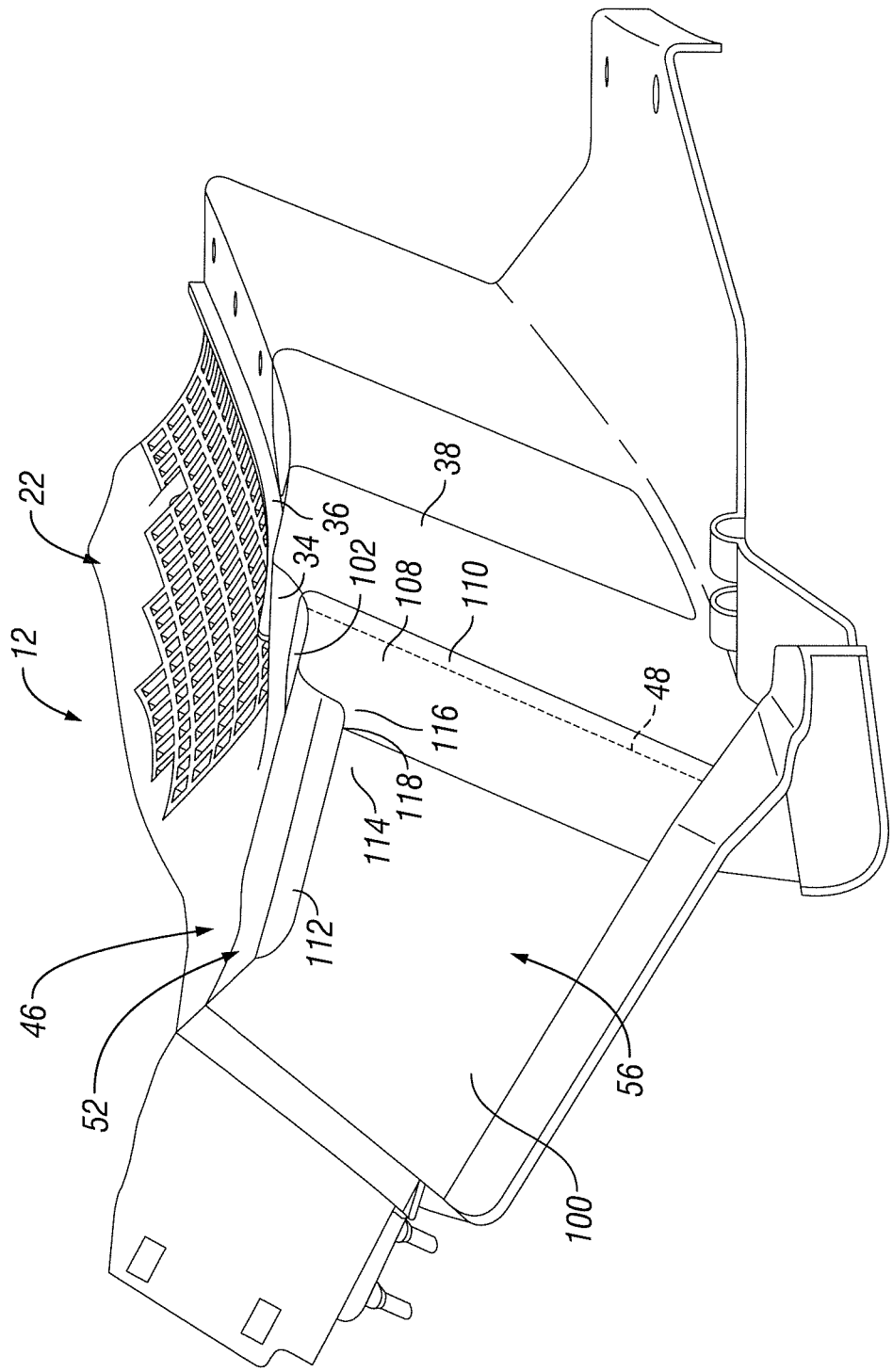
FIG. 8 is a detailed side view of the passenger side of the vehicle cowl cover.
Figure 9:
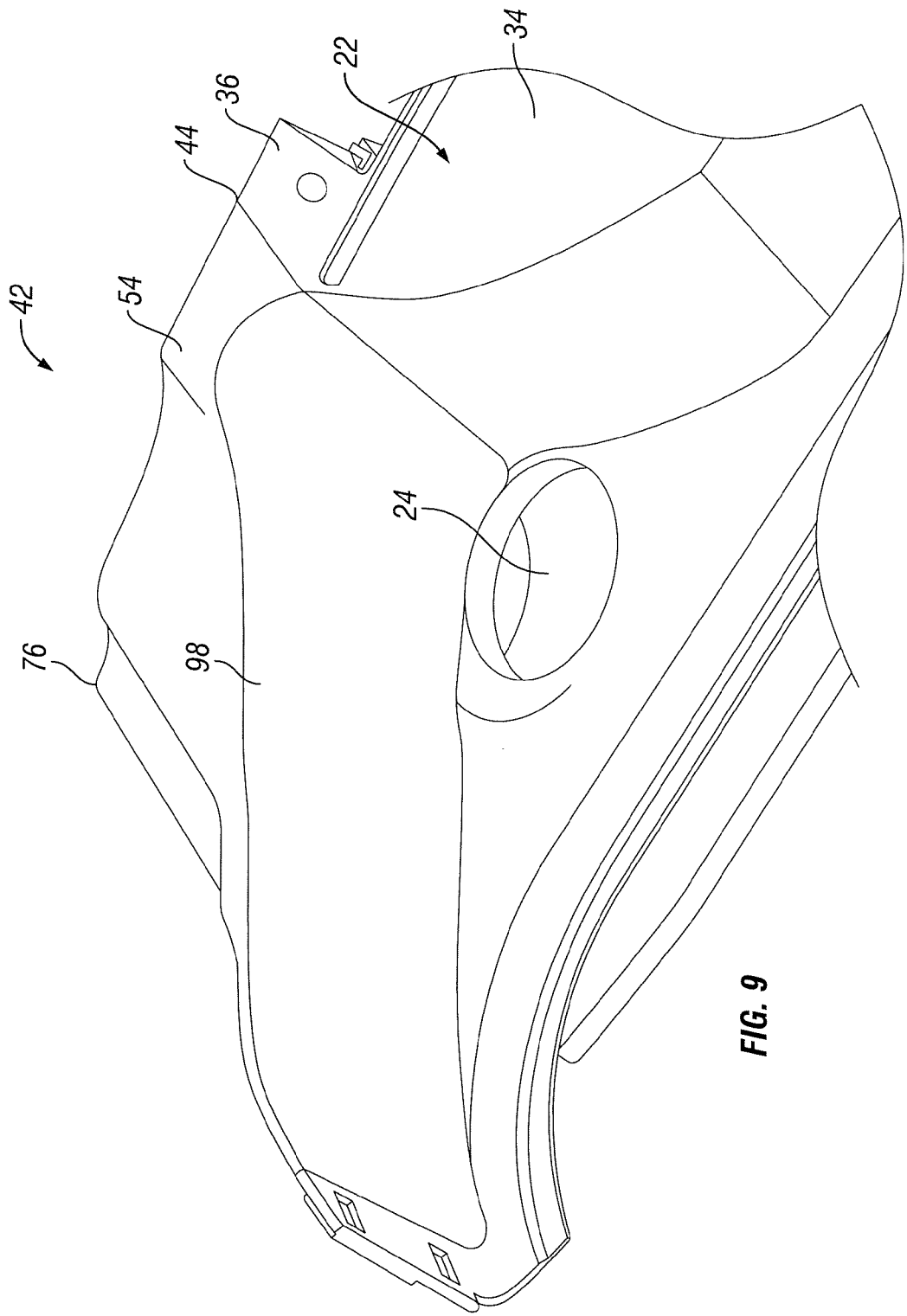
FIG. 9 is a top perspective view of the driver side from a rear area of the vehicle cowl cover.
Figure 10:
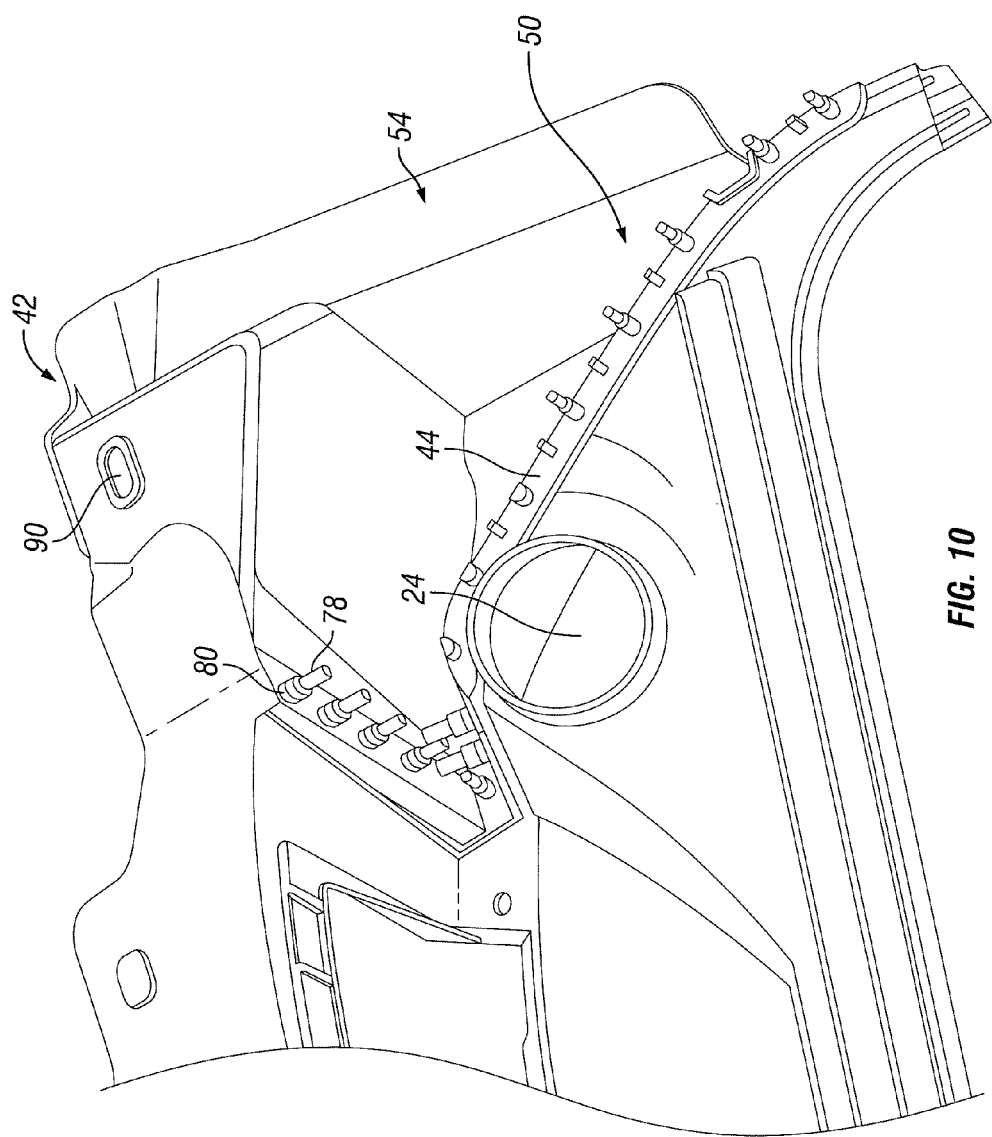
FIG. 10 is a bottom perspective view of the driver side from the rear area of the vehicle cowl cover.
Figure 11:
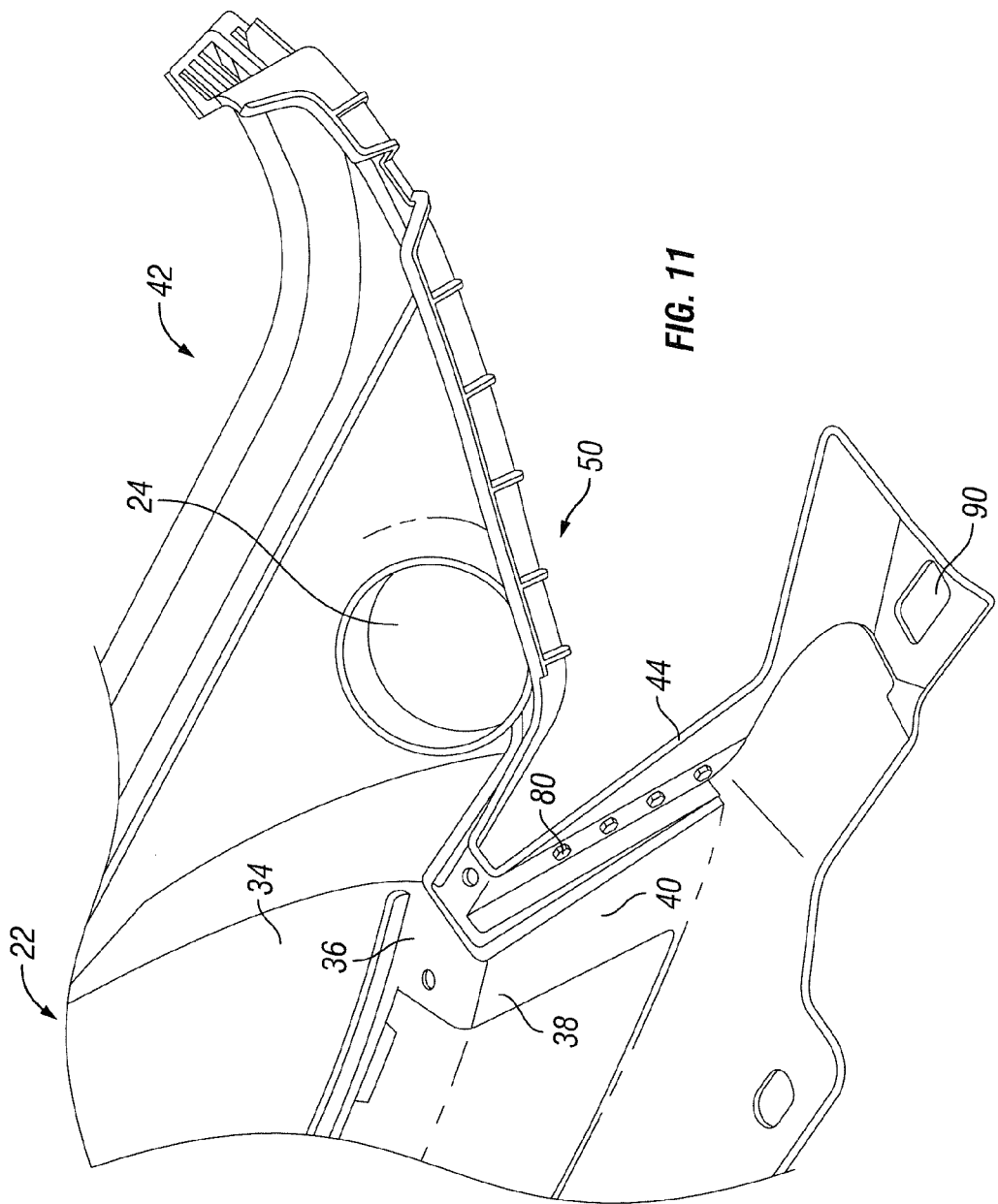
FIG. 11 is a detailed perspective view of the driver side of the vehicle cowl cover with the corresponding yielding portion removed.
Figure 12:
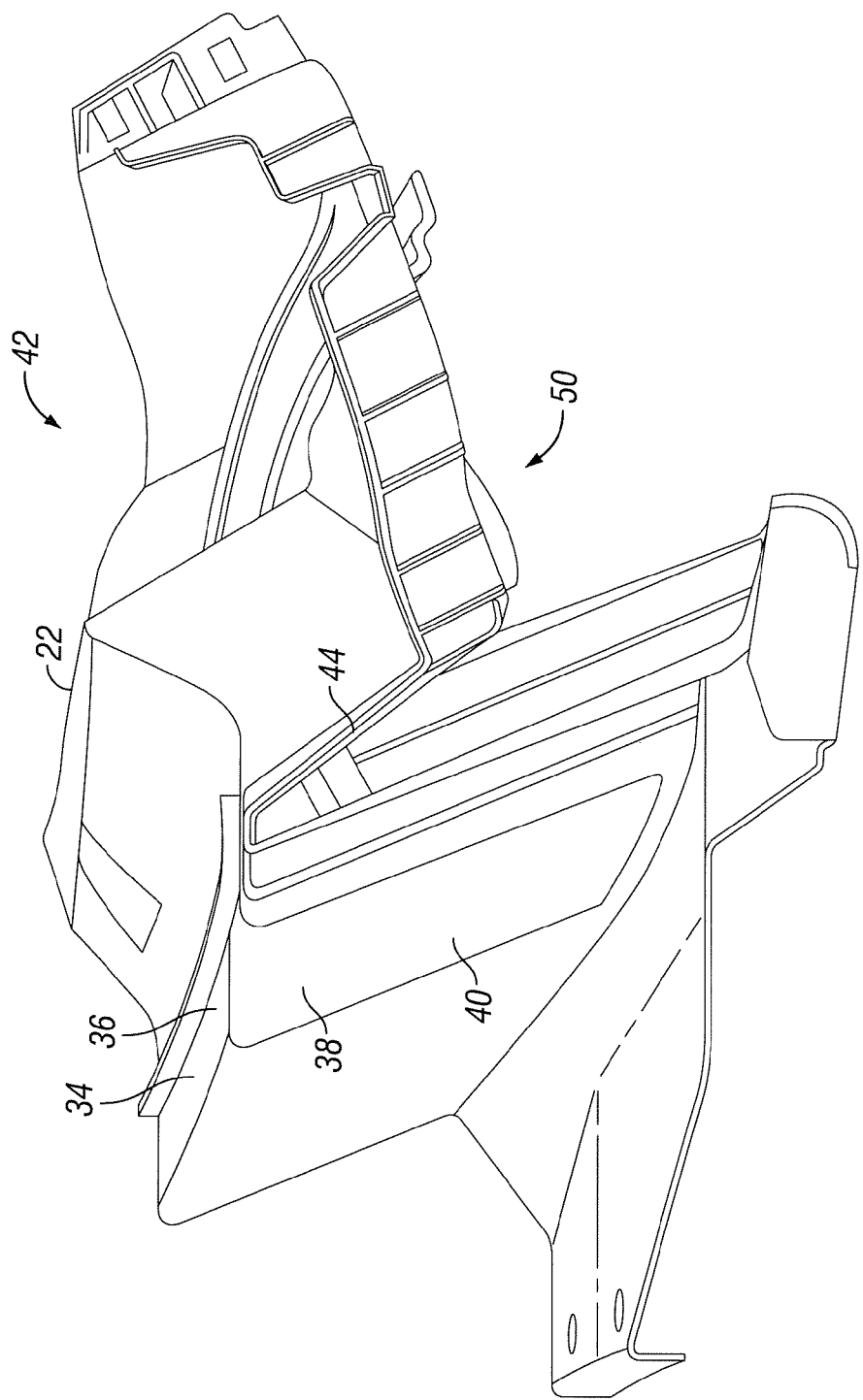
FIG. 12 is a detailed side view of the driver side of the vehicle cowl cover with the corresponding yielding portion removed.
Figure 13:
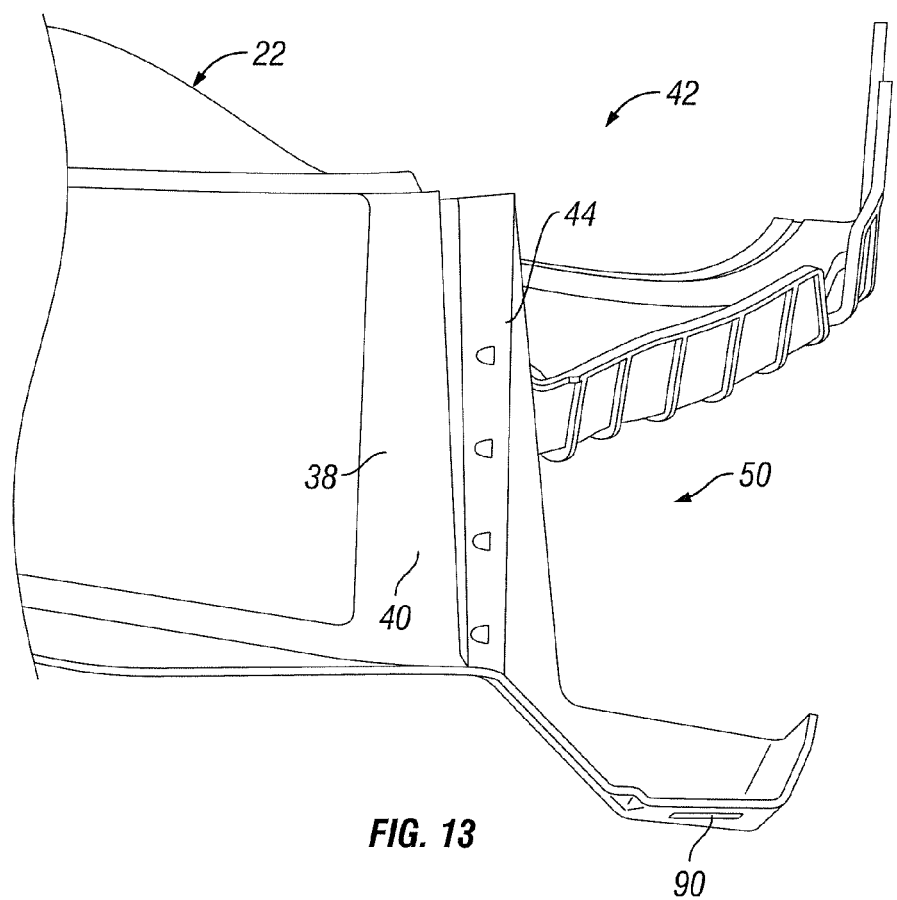
FIG. 13 is a front elevational view of the driver side of the vehicle cowl cover with the corresponding yielding portion removed.
Figure 14:
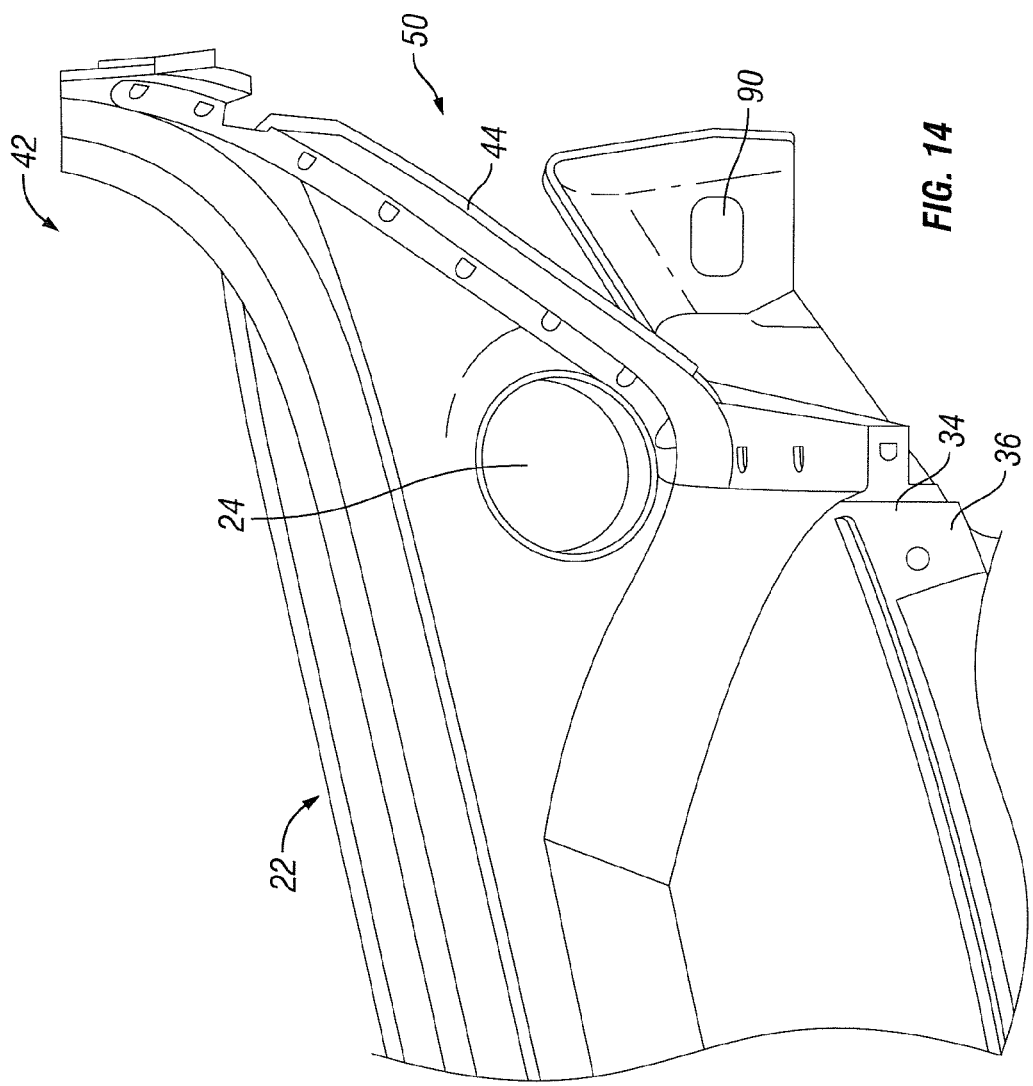
FIG. 14 is a top view of the driver side of the vehicle cowl cover with the corresponding yielding portion removed.
Figure 15:
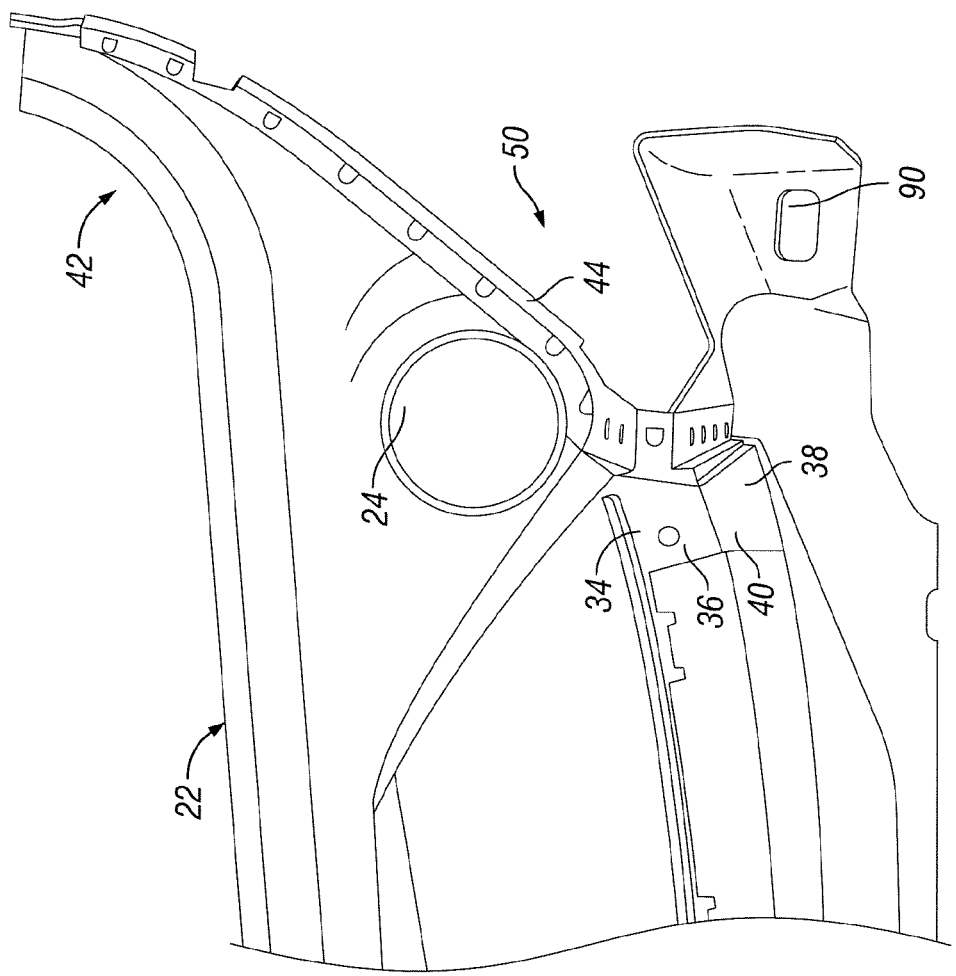
FIG. 15 is a detailed plan view of openings defined through the driver side of the vehicle cowl cover.
Figure 16:
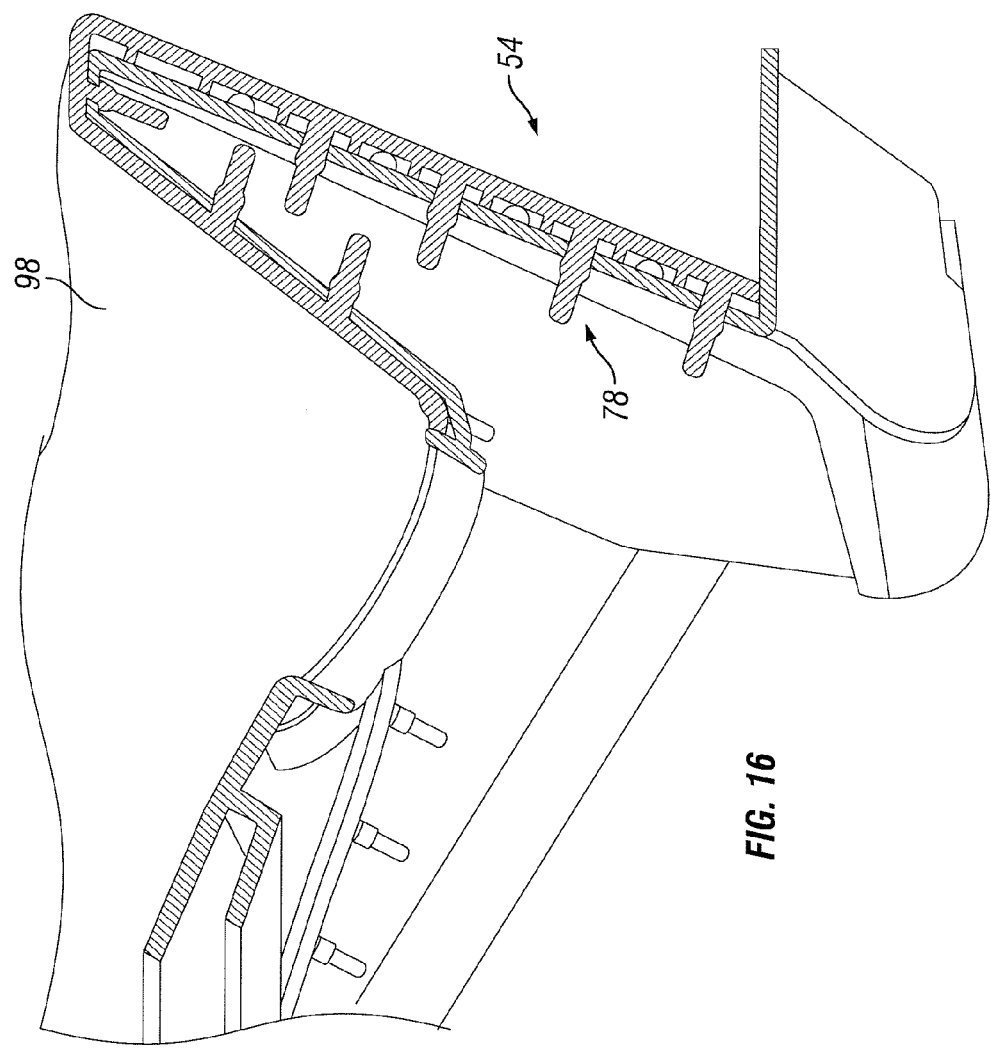
FIG. 16 is a cross-sectional view of the yielding portion attached to the driver side of the vehicle cowl cover.
Figure 17:
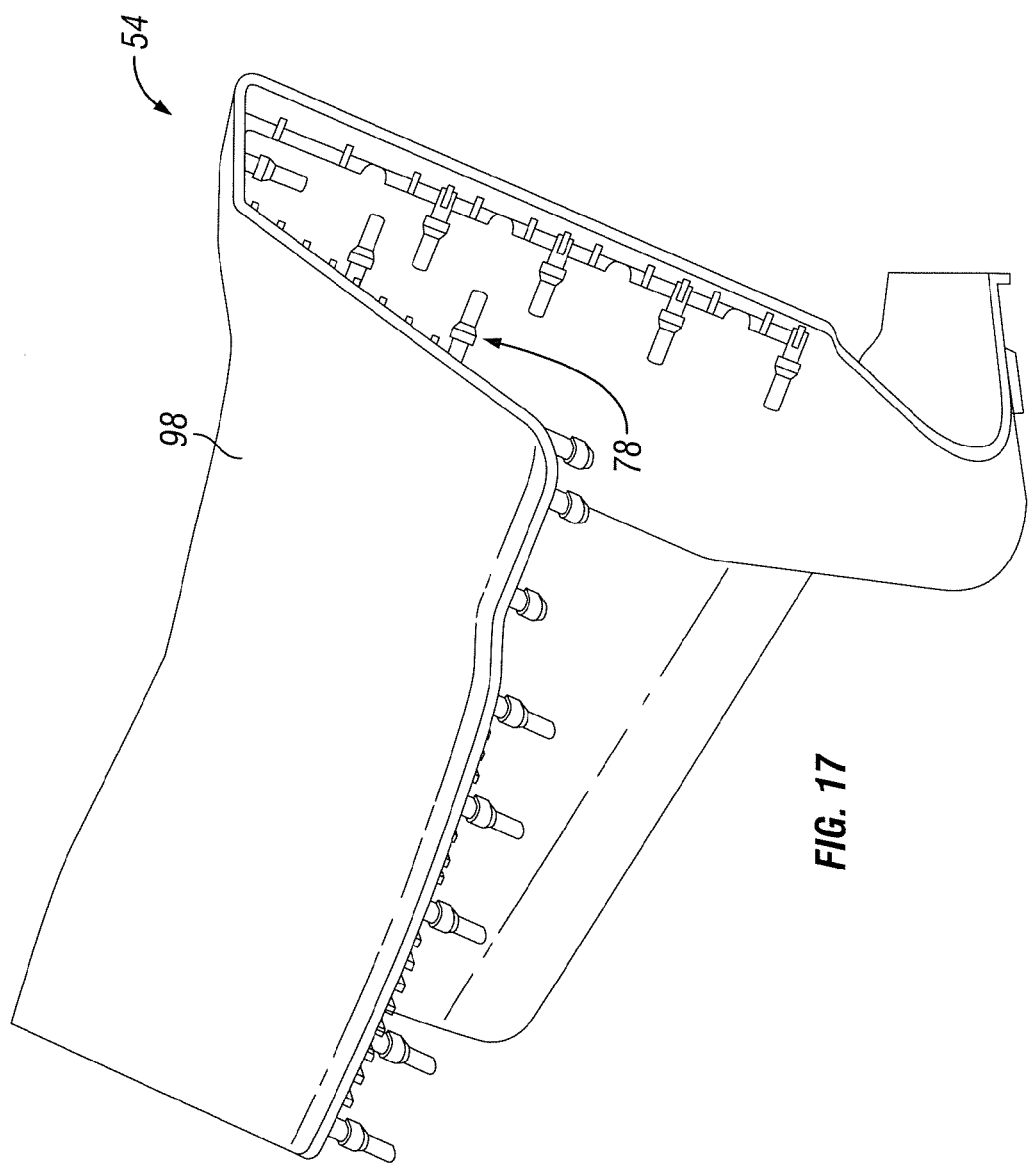
FIG. 17 is a side view of solely the yielding portion that attaches to the driver side of the vehicle cowl cover.
Figure 18:
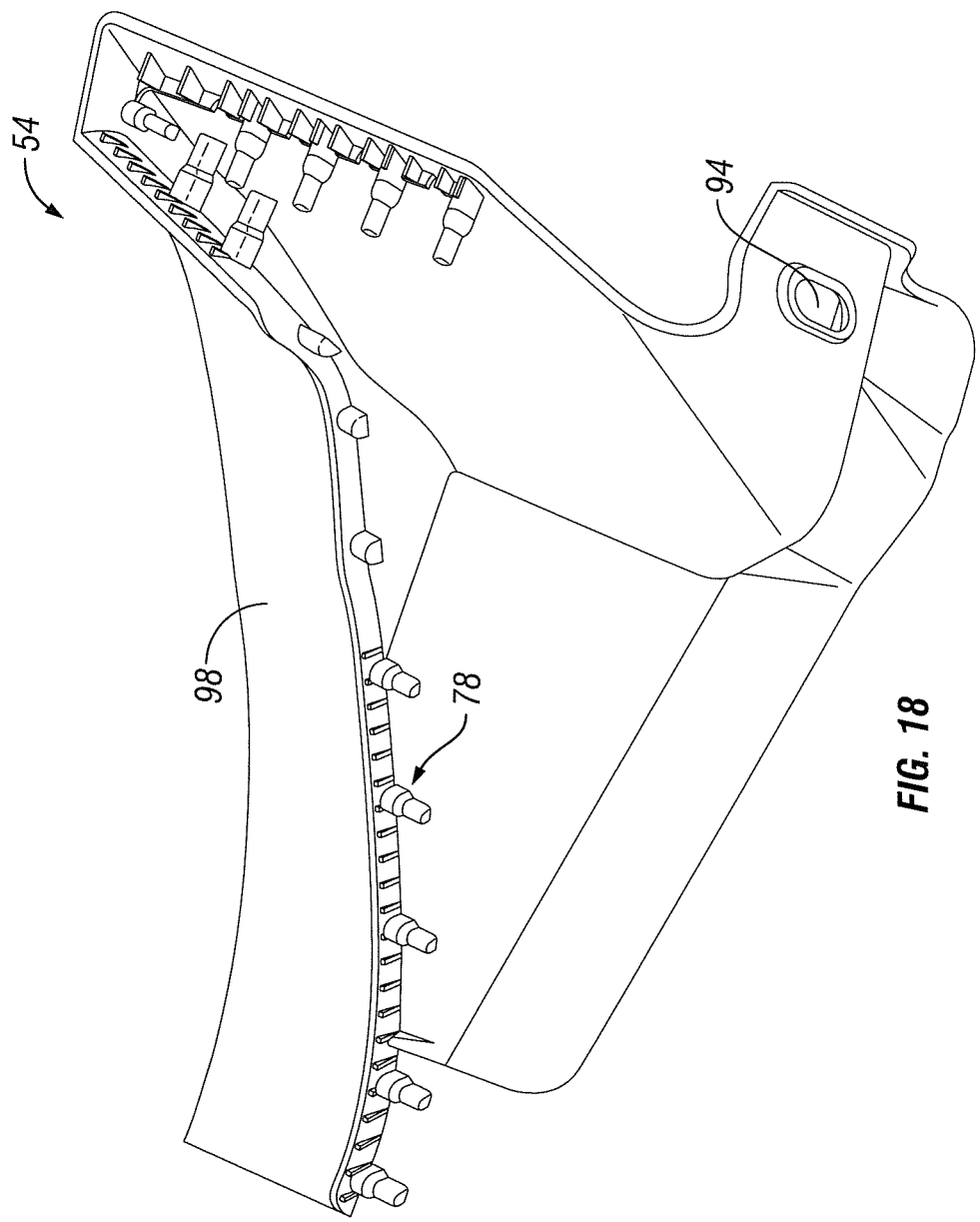
FIG. 18 is a bottom perspective view of the yielding portion that attaches to the driver side of the vehicle cowl cover.

As seen in FIGS. 2 through 4, the vehicle cowl cover 12 includes a main body 22 that at least partially covers a cowl box (not shown) of the vehicle 10. The main body 22 of the vehicle cowl cover 12 can be made of metal, plastic, composite or any other suitable material. Also, the vehicle cowl cover 12 can be configured as an integral-one piece unitary member, or as a plurality of components that are coupled together by snap fitting or by any suitable fastening members, such as adhesives, rivets, screws, bolts and so on as discussed below. The main body 22 includes windshield wiper apertures 24 that accommodate the rotating components (not shown) of the windshield wipers 20. Furthermore, the main body 22 of the vehicle cowl cover 12 is mounted to vehicle body panels 26, 28 and 30 of the vehicle 10 by any suitable fastening members 32, such as rivets, screws, bolts and so on.

As further illustrated in FIGS. 2 through 8, the main body 22 includes an exterior surface 34. In particular, the main body 22 includes a first body wall portion 36 and a second body wall portion 38 extending from the first body wall 36 portion to form a front exterior body surface 40. In addition, the main body 22 includes a first lateral end portion 42 defining a first end edge 44 and a second lateral end portion 46 defining a second end edge 48. The first end edge 44 defines a first cutaway section 50 that extends at least partially toward a central portion of the main body 22. Similarly, the second end edge 48 defines a second cutaway section 52 that extends at least partially toward the central portion of the main body 22.

The vehicle cowl cover 12 also includes a first yielding portion 54 and a second yielding portion 56. In this example, the first yielding portion 54 is a one-piece unitary member, and the second yielding portion 56 is a one-piece unitary member. However, the first yielding portion 54 can comprise a plurality of components coupled together by, for example, snap fitting, adhesive, fasteners or in any other suitable manner to form the first yielding portion 54. Likewise, the second yielding portion 56 can comprise a plurality of components coupled together by, for example, snap fitting, adhesives, fasteners or in any other suitable manner to form the second yielding portion 56.

The first yielding portion 54 can be made of, for example, a rubber or other suitable elastic type of material having an elasticity (a first elasticity) greater than the elasticity (a second elasticity) of the main body 22. Likewise, the second yielding portion 56 can be made of, for example, a rubber or other suitable elastic type of material having an elasticity (a third elasticity) greater than the elasticity (a second elasticity) of the main body 22. The first and second yielding portions 54 and 56 can be made of the same or similar materials, or different materials, as long as the elasticities of the first and second yielding portions 54 and 56 are each greater than the elasticity of the main body 22.

As illustrated, the first yielding portion 54 is received within the first cutaway section 50 at the first end edge 44 of the main body 22. Similarly, the second yielding portion 56 is received within the second cutaway section 52 at the second end edge 48 of the main body 22.

As shown in more detail in FIGS. 9-18, the first yielding portion 54 is attached along a majority of the first end edge 44 such that the first yielding portion 54 at least partially forms a first end surface 58 of the first lateral end portion 42. As indicated, the first yielding portion 54 further includes a first yielding exterior surface 60 configured such that a portion 62 of the first yielding exterior surface 60 aligns with or substantially aligns with the exterior surface 34 of the main body 22. That is, the first yielding portion 54 includes a first yielding wall 64 and a second yielding wall 66 extending from the first yielding wall 64 to form a first front exterior yielding surface 68. The first front exterior yielding surface 68 aligns with or substantially aligns with the front exterior body surface 40. Moreover, the first yielding exterior surface 60 of the first yielding portion 54 can be viewed as including a first exterior surface 70, a second exterior surface 72 and a third exterior surface 74 that are arranged to form a first exterior corner 76 of the vehicle cowl cover assembly 12.

As further shown, the first yielding portion 54 includes a plurality of first projections 78 that are each retained in a respective one of a plurality of first openings 80 defined by the main body 22. In this example, the main body 22 defines the first openings 80 proximate to the first end edge 44. The first openings 80 are spaced apart from one another along the first end edge 44 of the first lateral end portion 42. Each of the first projections 78 can be configured to snap-fit into a respective first opening 80. For instance, as shown in FIG. 19, a first projection 78 includes a first diameter portion 82, a second diameter portion 84 that preferably has a width greater than or equal to the first diameter portion 82 and a tapered portion 86 that is formed between the first diameter portion 82 and the second diameter portion 84. A step or surface 88 is formed at the end of the tapered portion 86 proximate to the second diameter portion 84 of the first projection 78. Accordingly, when the first projection 78 is inserted into a respective first opening 80, a force can be applied to the first diameter portion 82 to pull the tapered portion 86 through the first opening 80. The step or surface 88 at the edge of the tapered portion 86 can thus retain the first projection 78 in the first opening 80 in a snap-fit type manner. Thus, the engagement of the first projections 78 with the openings 80 openings couples the first yielding portion 54 to the main body 22.

The main body 22 further defines a first body mounting opening 90 through the first lateral end portion 42. The first body mounting opening 90 is configured to receive a fastener 92, such as a rivet, bolt, screw, and so on, which couples the main body 22 to the vehicle 10. Also, the first yielding portion 54 defines a first yielding opening 94 that is axially aligned with the first body mounting opening 90 and configured to receive the fastener 92 therethrough. Furthermore, a section 96 of the first yielding portion 54 adjacent to the first yielding opening 94 covers a portion of the main body 22 adjacent to the first body mounting opening 90.

In addition, the first yielding portion 54 defines a wall structure 98 configured to channel water away from the first lateral end portion 42 of the main body 22. In this example, the main body 22 defines one of the windshield wiper apertures 24 through the first lateral end portion 42, and the wall structure 98 faces the windshield wiper aperture 24.

As can be appreciated from FIGS. 2, 3, 7 and 8, the second yielding portion 56 is attached along a majority of the second end edge 48 in a manner similar to that in which the first yielding portion 54 is attached along a majority of the first end edge 44. Thus, the second yielding portion 56 at least partially forms a second end surface 100 of the second lateral end portion 46. Although not shown in detail, the second yielding portion 56 includes second projections that are identical or similar to the first projections 78 as described above. Accordingly, the second projections are each retained in a respective one of a plurality of second openings that are defined through the main body 22 proximate to the second end edge 48. Like the first openings 80, the second openings are spaced apart from one another along the second end edge 48 of the second lateral end portion 46. Thus, the engagement of the second projections with the second openings couples the second yielding portion 56 to the main body 22.

Also, as with the first yielding portion 54, the second yielding portion 56 further includes a second yielding exterior surface 102 configured such that a portion 104 of the second yielding exterior surface 102 aligns with or substantially aligns with the exterior surface 34 of the main body 22. That is, the second yielding portion 56 includes a first yielding wall 106 and a second yielding wall 108 extending from the first yielding wall 106 to form a second front exterior yielding surface 110. The second front exterior yielding surface 110 aligns with or substantially aligns with the front exterior body surface 40. Moreover, the second yielding exterior surface 102 of the second yielding portion 56 can be viewed as including a first exterior surface 112, a second exterior surface 114 and a third exterior surface 116 that are arranged to form a second exterior corner 118 of the vehicle cowl cover assembly 12.

The main body 22 further defines a second body mounting opening 120 through the second lateral end portion 46. The second body mounting opening 120 is configured to receive a fastener 122, such as a rivet, bolt, screw, and so on, which couples the main body 22 to the vehicle 10. Also, the second yielding portion 56 defines a second yielding opening 124 that is axially aligned with the second body mounting opening 120 and configured to receive the fastener 122 therethrough. Furthermore, a section 126 of the second yielding portion 56 adjacent to the second yielding opening 124 covers a portion of the main body 22 adjacent to the second body mounting opening 120.

As can be appreciated from the above, the first and second yielding portions 54 and 56 are more easily deformable than the main body 22 of the vehicle cowl cover 12. Therefore, the first and second yielding portions 54 and 56 can more readily absorb forces that would otherwise be applied to a colliding object (e.g., structure, other vehicle, pedestrian, foreign object, etc.) during forward vehicle movement. The vehicle cowl cover 12 can also assist with water management due to, for example, the configuration of the first yielding portion 54.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cowl cover assembly comprising:
    a main body including a first lateral end portion defining a first end edge, a second lateral end portion defining a second end edge, and a first body wall portion and a second body wall portion extending from the first body wall portion to form a front exterior body surface; and
    a first yielding portion attached along a majority of the first end edge such that the first yielding portion at least partially forms a first end surface of the first lateral end portion, the first yielding portion having a first elasticity greater than a second elasticity of the main body, and the first yielding portion including a first yielding wall and a second yielding wall extending from the first yielding wall to form a front exterior yielding surface that aligns with the front exterior body surface.

2. The vehicle cowl cover assembly according to claim 1, wherein
    the first yielding portion includes a projection retained in an opening defined by the main body.

3. The vehicle cowl cover assembly according to claim 2, wherein the main body defines the opening proximate to the first end edge.

4. The vehicle cowl cover assembly according to claim 2, wherein the projection is configured to snap-fit into the opening.

5. The vehicle cowl cover assembly according to claim 1, wherein
    the first yielding portion includes a plurality of projections, with each of the plurality of projections being retained in a respective one of a plurality of openings defined by the main body.

6. The vehicle cowl cover assembly according to claim 5, wherein
    the plurality of openings comprises openings that are spaced apart from one another along the first end edge of the first lateral end portion.

7. The vehicle cowl cover assembly according to claim 1, wherein
    the first yielding portion further includes a yielding exterior surface configured such that a portion of the yielding exterior surface aligns with the front exterior body surface of the main body.

8. The vehicle cowl cover assembly according to claim 1, wherein
    the first yielding portion defines a wall structure configured to channel water away from the first lateral end portion of the main body.

9. The vehicle cowl cover assembly comprising:
a main body including a first lateral end portion defining a first end edge and a second lateral end portion defining a second end edge, the main body defining a first body mounting opening through the first lateral end portion, the first body mounting opening being configured to receive a fastener which couples the main body to a vehicle including the vehicle cowl cover assembly; and
a first yielding portion attached along a majority of the first end edge such that the first yielding portion at least partially forms a first end surface of the first lateral end portion, the first yielding portion having a first elasticity greater a second elasticity of the main body, and the first yielding portion defining a first yielding opening that is axially aligned with the first body mounting opening and configured to receive the fastener therethrough.

10. The vehicle cowl cover assembly according to claim 9, wherein
a section of the first yielding portion adjacent to the yielding opening covers a portion of the main body adjacent to the first body mounting opening.

11. The vehicle cowl cover assembly according to claim 1, wherein
the first end edge defines a cutaway section that extends at least partially toward a central portion of the main body, the first yielding portion being received within the cutaway section.

12. The vehicle cowl cover assembly according to claim 1, wherein
the first yielding portion includes a first exterior surface, a second exterior surface and a third exterior surface that are arranged to form a first exterior corner of the vehicle cowl cover assembly.

13. The vehicle cowl cover assembly according to claim 9, wherein
the main body further includes a first body wall portion and a second body wall portion extending from the first body wall portion to form a front exterior body surface; and
the first yielding portion includes a first yielding wall and a second yielding wall extending from the first yielding wall to form a front exterior yielding surface that aligns with the front exterior body surface.

14. The vehicle cowl cover assembly according to claim 1, wherein the first yielding portion is a one-piece unitary member.

15. A vehicle cowl cover assembly according to claim 1, further comprising
a second yielding portion attached along a majority of the second end edge such that the second yielding portion at least partially forms a second end surface of the second lateral end portion, the second yielding portion having a third elasticity that is greater than the second elasticity of the main body.

16. The vehicle cowl cover assembly according to claim 15, wherein
the second yielding portion is a one-piece unitary member.

17. The vehicle cowl cover assembly according to claim 15, wherein
the first yielding portion includes first projections that are retained in first openings defined through the main body proximate to the first end edge; and
the second yielding portion includes second projections that are retained in second openings defined through the main body proximate to the second end edge.

18. The vehicle cowl cover assembly according to claim 17, wherein
the first openings are spaced apart from one another along the first end edge of the first lateral end portion; and
the second openings are spaced apart from one another along the second end edge of the second lateral end portion.

19. The vehicle cowl cover assembly according to claim 15, wherein
the first end edge defines a first cutaway section that extends at least partially toward a central portion of the main body, the first yielding portion being received within the first cutaway section; and
the second end edge defines a second cutaway section that extends at least partially toward the central portion of the main body, the second yielding portion being received within the second cutaway section.

20. The vehicle cowl cover assembly comprising:
a main body including a first lateral end portion defining a first end edge and a second lateral end portion defining a second end edge, the main body defining a windshield wiper aperture through the first lateral end portion; and
a first yielding portion attached along a majority of the first end edge such that the first yielding portion at least partially forms a first end surface of the first lateral end portion, the first yielding portion having a first elasticity greater than a second elasticity of the main body and defining a wall structure that faces and at least partially surrounds the windshield wiper aperture.

* * * * *